United States Patent
Gaines

Patent Number: 5,474,367
Date of Patent: Dec. 12, 1995

[54] ACTUATION MEMBER FOR A PROPORTIONING VALVE FOR LOAD LEVELING APPLICATIONS

[75] Inventor: Michael G. Gaines, Jackson, Mich.

[73] Assignee: Monroe Auto Equipment Company, Monroe, Mich.

[21] Appl. No.: 390,433

[22] Filed: Feb. 14, 1995

Related U.S. Application Data

[63] Continuation of Ser. No. 73,900, Jun. 9, 1993, abandoned.

[51] Int. Cl.$^6$ ............................................ B60T 8/18
[52] U.S. Cl. ........................ 303/22.5; 188/195; 303/9.64
[58] Field of Search ............................ 303/22.5, 9.69, 303/22.1; 188/195, 299; 207/DIG. 1, DIG. 2, 64.16, 64.28; 280/699, 692, 703, 709, 710, 711, 712, 713, 714

[56] References Cited

U.S. PATENT DOCUMENTS

| | | | |
|---|---|---|---|
| 2,150,576 | 3/1939 | Bell | 188/195 |
| 3,159,433 | 12/1964 | Chevreux et al. | 303/22.1 |
| 3,162,491 | 12/1964 | Van Winsen | 303/6.01 |
| 3,362,758 | 1/1968 | Goerke et al. | 303/22.5 |
| 3,393,946 | 7/1968 | Julow | 303/22.5 |
| 3,702,207 | 11/1972 | Armstrong | 303/22.1 |
| 3,827,764 | 8/1974 | Giordano et al. | 188/195 |
| 4,072,361 | 2/1978 | Hales | 303/6.01 |
| 4,090,740 | 5/1978 | Farr | 303/22.1 |
| 4,111,494 | 9/1978 | Young | 303/6.01 |
| 4,111,495 | 9/1978 | Peeples | 303/6.01 |
| 4,113,318 | 9/1978 | Doi | 303/22.1 |
| 4,358,163 | 11/1982 | Young | 303/22.1 |
| 4,700,990 | 10/1987 | Reynolds | 303/6.01 |
| 4,707,036 | 11/1987 | Farr | 303/6.01 |
| 4,707,037 | 11/1987 | Rüdiger | 303/22.1 |
| 4,795,219 | 1/1989 | Brearley et al. | 303/9.69 |
| 4,925,251 | 5/1990 | Picot et al. | 303/22.5 |

FOREIGN PATENT DOCUMENTS 3-243451 10/1991 Japan.

*Primary Examiner*—Matthew C. Graham
*Attorney, Agent, or Firm*—Harness, Dickey & Pierce

[57] ABSTRACT

A proportioning valve actuation member (110) for a vehicle (12) having a braking system and a load leveling system has an actuator (22) mounted between the proportioning valve (20) of the braking system and the rear suspension (14) of the vehicle (12). The actuator (22) is operative to increase the amount of braking applied to the rear wheels in response to the movement of the rear suspension (14). The actuation member (110) further includes an activation cylinder (112) which is placed in parallel with the actuator (22) and is in communication with the load leveling system. When the load leveling system activates to correct the attitude of the vehicle (12), the activation cylinder (112) is also signaled to correct the reading provided to the proportioning valve (20) by the actuator (22).

16 Claims, 3 Drawing Sheets

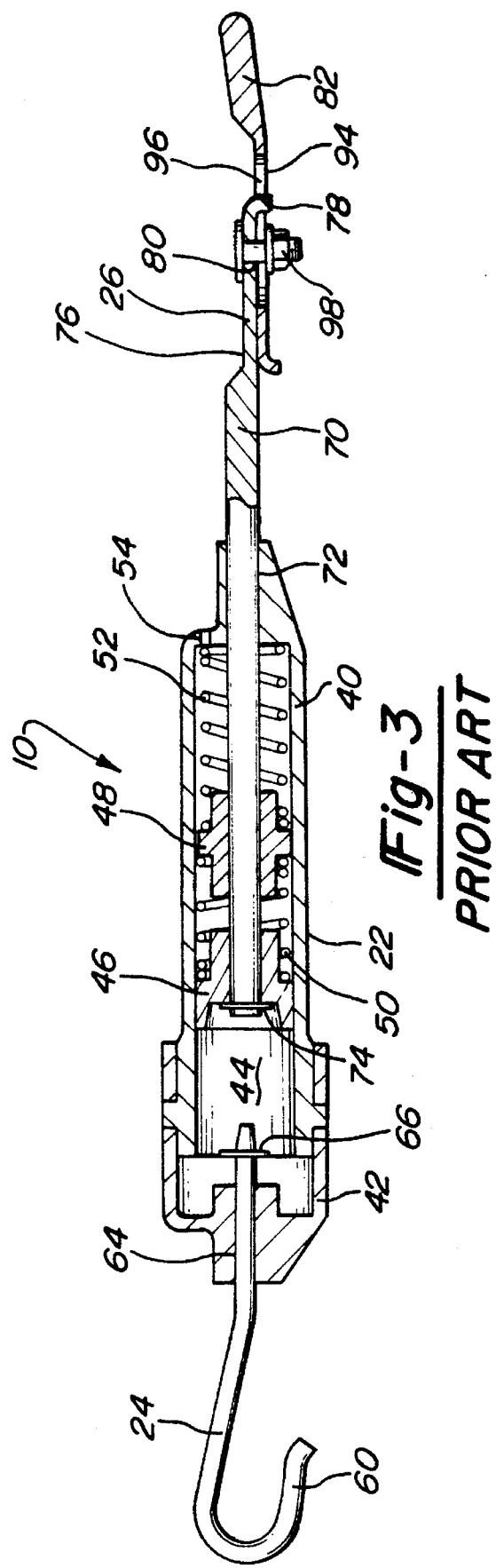
Fig-3 *PRIOR ART*
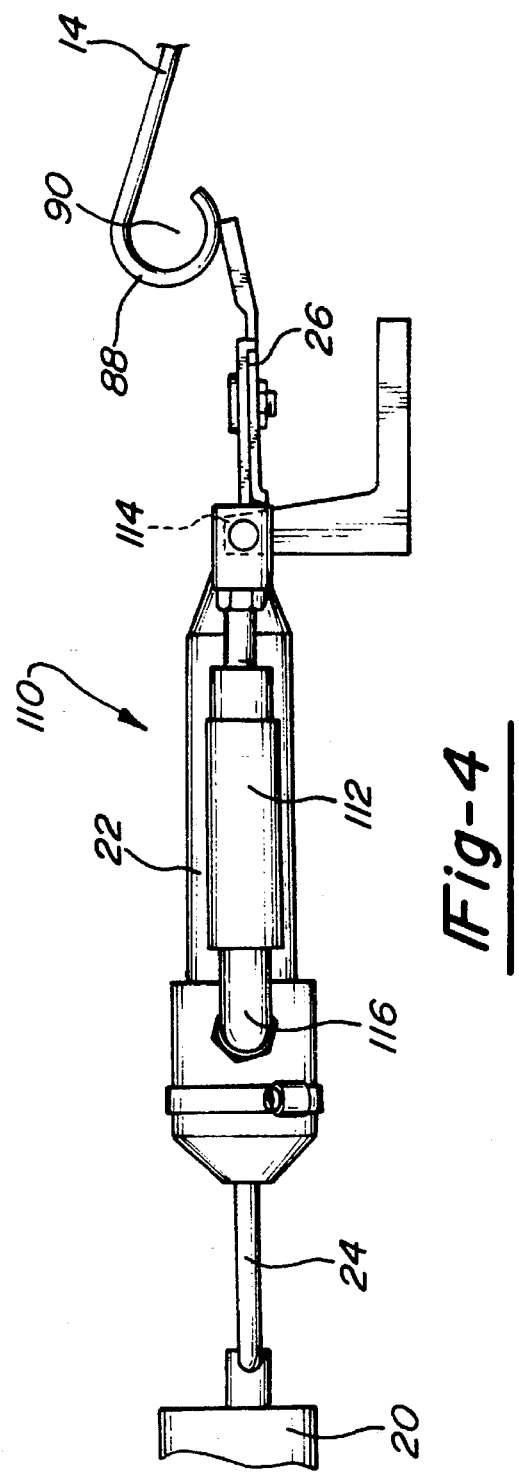
Fig-4

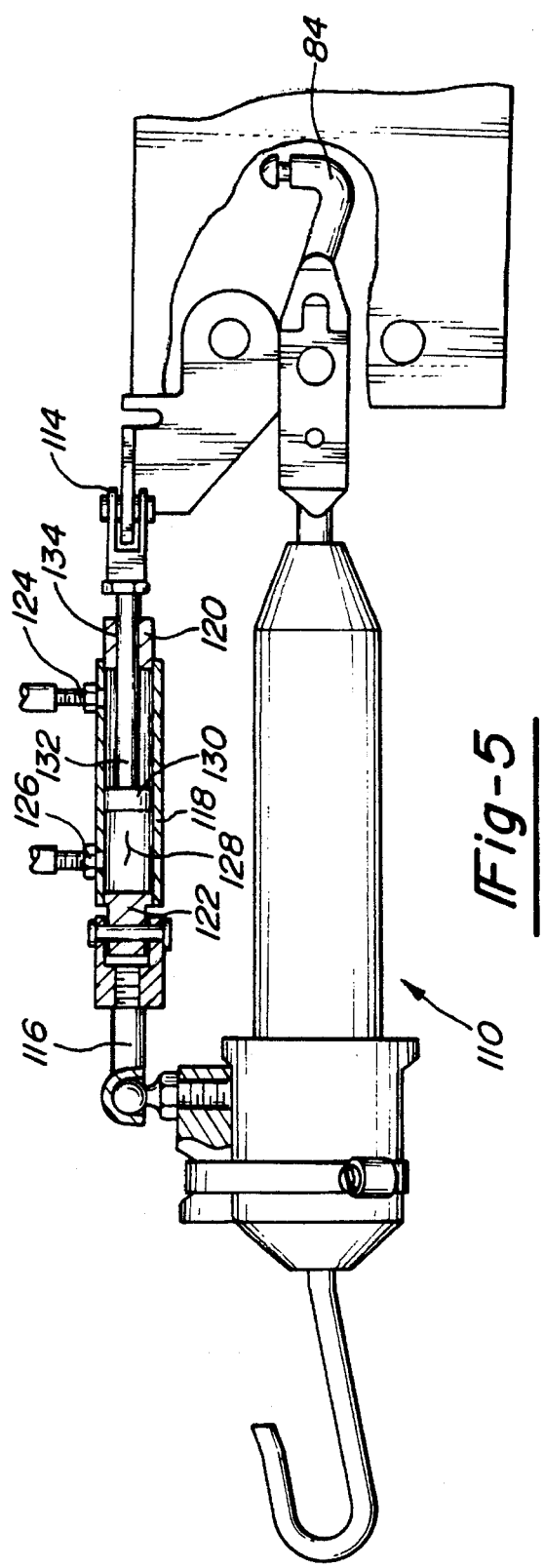
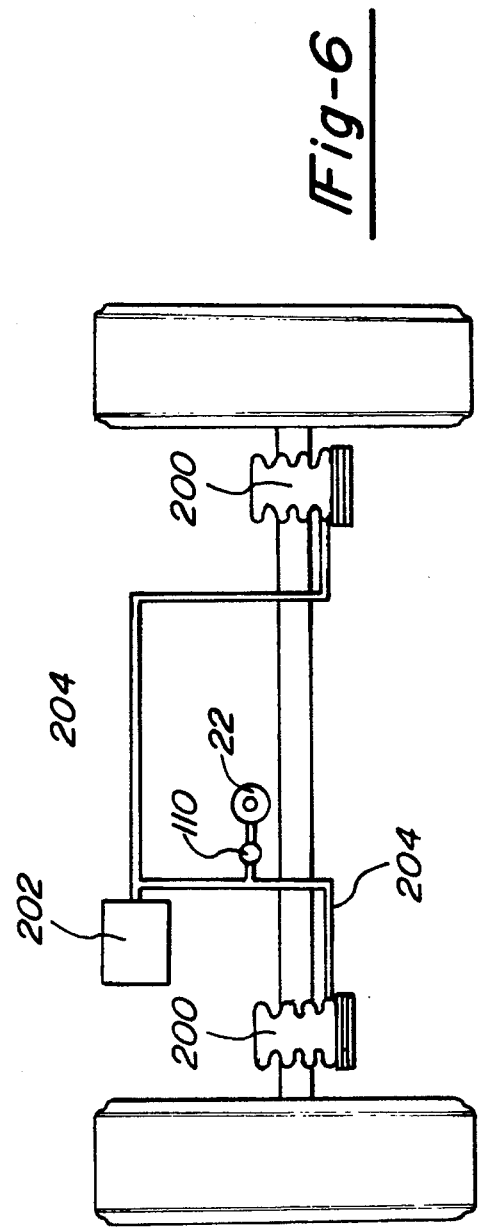

ACTUATION MEMBER FOR A PROPORTIONING VALVE FOR LOAD LEVELING APPLICATIONS

This is a continuation of U.S. patent application Ser. No. 08/073,900, filed Jun. 9, 1993, which has been expressly abandoned.

FIELD OF THE INVENTION

The present invention relates to a control member which operates to adjust the proportioning valve in a vehicle braking system. More particularly, the present invention relates to a control member which operates to adjust the proportioning valve in a vehicle equipped with a load leveling device.

BACKGROUND OF THE INVENTION

It is well known that one of the factors controlling the adhesion between the tires of a vehicle and the road surface is the load being carried by the vehicle wheels. Thus, under any road surface conditions, the brakes of a vehicle can be applied to a greater extent without causing skidding of the wheels when the vehicle is heavily loaded than when the vehicle is lightly loaded. Furthermore, it is well known that the distribution of the total weight of the vehicle body among the wheels of the vehicle varies dynamically as the vehicle is being driven so that the proportion of the total weight of the vehicle supported by any one wheel of the vehicle is not likely to remain constant.

Braking of an automotive vehicle is one condition which affects the weight distribution among the various wheels of the vehicle. Upon the braking of the automotive vehicle, a load shift phenomenon occurs wherein the share of the vehicle load supported by the front wheels under normal unbraked conditions dynamically increases and the share of the load supported by the rear wheels decreases. This is due to inertia forces which are proportionate to the amount of deceleration of the vehicle produced by the braking operation. Due to this load shifting phenomenon, the braking ability of the front wheels increases and the braking ability of the rear wheels decreases.

In order to compensate for this condition and to prevent locking of the rear wheels with brake application, it is desirable to either increase the hydraulic pressure supplied to the front wheel brakes in proportion to the deceleration of the vehicle while the hydraulic fluid pressure generated in the brake master cylinder is being supplied directly to the rear wheel brakes, or to reduce the hydraulic pressure supplied to the rear wheel brakes in proportion to the deceleration of the vehicle while the hydraulic fluid pressure generated in the brake master cylinder is supplied directly to the front wheel brakes. The present invention relates to the latter type of pressure proportioning systems.

A number of different techniques and structures have been developed over the years to reduce the hydraulic pressure being supplied to the rear wheel brakes in proportion to the deceleration of the vehicle. Some of these prior art devices provide effective braking power distribution corresponding to various degrees of deceleration of the vehicle, but only under one given load condition of the vehicle. It is desirable to obtain effective distribution of front and rear wheel braking power to prevent premature locking of the rear wheels at such time that excessive braking occurs over and entire range of possible vehicle loading conditions to thereby prevent the occurrence of vehicle spinning.

For vehicles which are subjected to variations in load conditions, it is common to incorporate into the proportioning reduction valve assembly a device which indirectly senses the weight of the vehicle load or the total weight of the loaded vehicle and correspondingly suppresses the hydraulic pressure supplied from the proportioning reduction valve to the vehicle rear brakes. These devices increase the level of hydraulic pressure required to start the pressure reduction operation of the reduction valve in proportion to the vehicle load to provide effective front and rear wheel braking power distribution which corresponds respectively to various decelerations caused by braking operations under any given vehicle loading conditions.

The normal method for making a proportioning valve sensitive to the vehicle loading conditions is to follow the collapse of the vehicle suspension system as the load on the suspension system is increased. In order to follow the collapse of the suspension system, various mechanisms have been developed to interconnect the proportioning valve with the suspension system. These devices include systems of springs and levers as well as electronic sensors including accelerometers, load cells or proximity transducers sensing movement of a load sensitive suspension member.

The short comings of these prior art systems is that they rely on the position of the suspension system to determine the load supported by the rear wheels. While this may be an accurate estimate for some vehicles, the vehicles which incorporate load leveling devices relocate or readjust the position of the suspension system based upon the load being supported. This readjustment in the relative position of the suspension system thus leads to a misreading by the brake proportioning sensors as to the actual load being supported by the rear wheels. This in turn prevents the transfer of vehicle braking to the rear wheels and leaves an excessive amount of vehicle braking on the front wheels thus not effectively utilizing the entire braking power of the vehicle.

Accordingly, what is needed is a system for indicating the load being supported by the rear wheels of a vehicle which is able to take into consideration, when indicating the supported load, the readjustment in the relative position of the suspension system caused by a load leveling device being incorporated into the vehicles suspension system.

SUMMARY OF THE INVENTION

The present invention provides the art with a proportioning valve control system for use on a vehicle incorporating a load leveling device. The present invention provides a parallel function actuator which either replaces or may be positioned in parallel to the standard proportioning valve actuator linkage. The parallel function actuator provides replacement control or parallel control for the standard proportioning valve actuator linkage based upon the amount of load assist being supplied by the load leveling system. When used in parallel with the proportioning valve actuator linkage, the parallel function actuator effectively corrects the reading which the proportioning valve actuator linkage is sending. The present invention is capable of being retrofitted to existing braking systems without affecting the normal operation of the original braking system. When encountering a problem with the control system or the load leveling system, the present invention will default back to the original braking system of the vehicle.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 3 is a cross sectional side view of the actuator shown in FIG. 2;

FIG. 4 is a side elevation view showing a proportioning valve actuator which compensates for the vehicle's leveling system according to the present invention;

FIG. 5 is a cross sectional side view of the actuator shown in FIG. 4; and

FIG. 6 is a schematic diagram showing the hydraulic system including the lifting units of the leveling system.

DESCRIPTION OF THE PREFERRED EMBODIMENT

Figure 1:
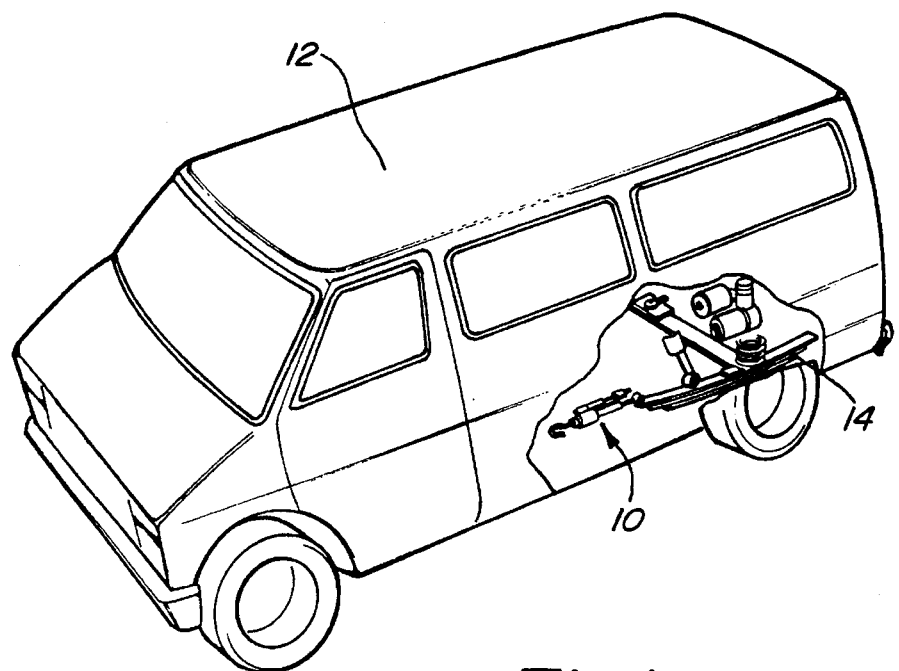
FIG. 1 is a partially cut away perspective view of an automotive vehicle incorporating a proportioning valve control system.
Figure 2:
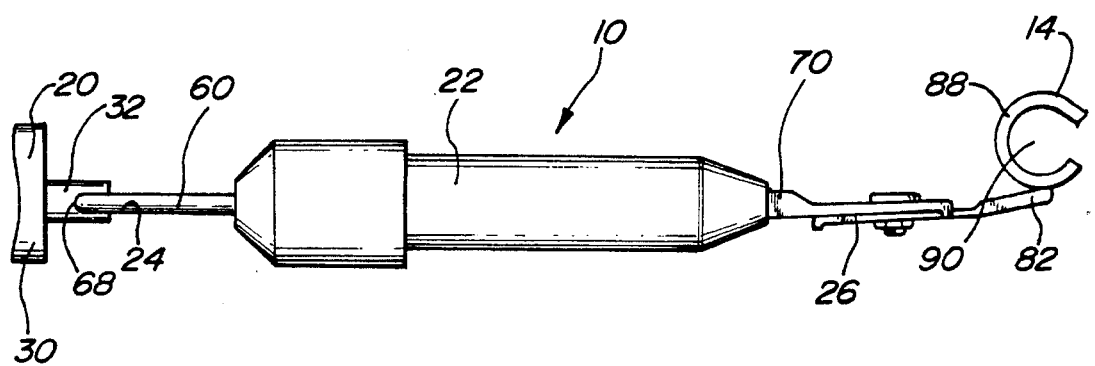
FIG. 2 is a side elevation view showing a prior art proportioning valve actuator which does not compensate for a vehicle leveling system.

Referring now to the drawings in which like reference numerals designate like or corresponding parts throughout the several views, there is shown in FIGS. 1 through 3 a prior art proportioning valve actuation member which is generally designated as 10. Actuation member 10 is shown incorporated into an automotive vehicle 12 equipped with a multi-leaf rear suspension 14. Actuation member 10 comprises a variable proportioning valve 20, a proportioning valve actuator 22, linkage 24 between valve 20 and actuator 22 for providing a means for mechanically linking actuation member 10 to valve 20 and linkage 26 between valve 20 and rear suspension 14 for providing means for mechanically linking actuation member 10 to rear suspension 14.

Variable proportioning valve 20 is well known in the art and generally comprises a valve body 30 and an actuation rod 32. The amount of brake fluid pressure which is delivered to the rear wheels is controlled by valve 20. A specified amount of brake fluid pressure is normally applied to the rear wheels. As load is applied to actuation rod 32 in a direction away from valve body 30, the amount of brake fluid pressure delivered to the rear wheels will increase. The amount of increase in brake fluid pressure delivered to the rear wheels is a function of the internal components of valve body 30 which react to the increase in load applied to actuation rod 32. The actual construction of proportioning valve 20 is not part of the present invention and is well known in the art. Actuator 22 provides a means for applying load to actuation rod 32 in response to the position of rear suspension 14.

Actuator 22, which is also well known in the art, comprises a tubular shaped body 40 which is closed at one end and open at the other. A cap 42 is positioned over the open end of body 40 and is fixed secured thereto to form a closed elongated chamber 44. Disposed within chamber 44 is piston 46 and guide 48. Disposed between piston 46 and guide 48 is a first coil spring 50. Disposed between guide 48 and the closed end of body 40 is a second coil spring 52. In practice, the rate of coil spring 50 is chosen to be less than the rate of coil spring 52. Both piston 46 and guide 48 are shaped to provide support for coil springs 50 and 52 as shown in FIG. 3. A vent hole 54 is provided in the closed end of body 40 to vent chamber 44 to atmosphere.

Linkage 24 is a generally cylindrical rod having a hook 60 at one end thereof with the opposite end extending through a hole 64 located in cap 42. Linkage 24 extends through hole 64 in cap 42 and terminates within chamber 44. A retainer 66 located within chamber 44 prevents removal of linkage 24 from cap 42. Hook 60 engages a corresponding aperture 68 located in actuation rod 32 of valve 20.

Linkage 26 comprises a generally cylindrical rod 70 slidingly received in a hole 72 through the closed end of body 40. Rod 70 extends axially through the center of chamber 44, coil spring 52, guide 48, coil spring 50 and piston 46. A retainer 74 located on the side of piston 46 adjacent cap 42 prevents removal of rod 70 from body 40. The end of rod 70 which extends outside of chamber 44 has a flattened portion 76 with a downturned lip 78. An attachment hole 80 extends through flattened portion 76 for adjustment of the length of linkage 26 as will be described later herein. Linkage 26 further comprises a second circular rod 82 which is formed into a hook 84 at one end as best shown in FIG. 5. Hook 84 is adapted for connection to rear suspension 14 by being secured to an exterior wrap of a leaf spring 88 which forms a connecting eye 90. Connecting eye 90 is used to attach rear suspension 14 to the sprung mass of the vehicle. As additional amounts of weight are supported by rear suspension 14, the exterior wrap of leaf spring 88 will rotate in a counterclockwise direction causing translational movement of linkage 26. The end of circular rod 82 opposite to hook 84 has a flattened portion 94 having a slot 96 formed therethrough. During initial assembly of vehicle 12, hook 60 is engaged with actuation rod 32 and hook 84 is engaged with the exterior wrap of leaf spring 88. Lip 78 is positioned within slot 96 and the length of actuation member 10 is set at a length which places a specified preload on coil springs 50 and 52. Once the proper preload, and in turn, the length of actuation member 10 is reached, a bolt 98 is assembled through hole 80 and slot 96 securing flattened portion 76 to flattened portion 94. This secures the length of linkage 26 and positions actuation member 10 as its proper length to exert the specified load on actuation rod 32 to provide the proper amount of braking to the rear wheels.

The operation of actuation member 10 begins with the components positioned as shown in FIG. 2. As described above, actuation member 10 is assembled to a specified length and a specified load is being exerted on actuation rod 32 by coil springs 50 and 52. When weight is added to the sprung mass at the rear of vehicle 12, the sprung mass moves lower and is supported by the flexing of the leaf springs including leaf spring 88. This flexing of leaf spring 88 causes eye 90 of leaf spring 88 to rotate in a counterclockwise direction as shown in FIG. 2. This counterclockwise movement of eye 90 moves linkage 26 to the right as shown in FIG. 2 to extend the length of actuation member 10 and further compress coil springs 50 and 52. The further compression of coil springs 50 and 52 exert a larger load on actuation rod 32. This increase in load signals proportioning valve 20 to direct a higher portion of the vehicle's braking to the rear wheels as the rear wheels are now supporting a higher load. When the load is removed from the sprung mass at the rear of vehicle 12, the sprung mass returns to its original position along with the length of actuation member 10. This return to the original length of actuation member 10 again applies the pre-specified amount of braking to the rear wheels.

The above described actuation member 10 is well known in the art and works satisfactorily for most vehicles with the exception of vehicles which incorporate a load leveling system. A typical load leveling system uses an additional member in addition to the springs to support the load of the vehicle. The additional member can be a fluid shock, a fluid spring or any other type of device known in the art. In the preferred embodiment, the additional member is a pair of fluid springs 200 as shown in FIG. 6. The purpose of a load leveling system to keep the vehicle at design height regardless of the loading of the vehicle. This is accomplished by positioning fluid springs 200 between the sprung and unsprung mass of the vehicle such that when fluid pressure is provided to fluid springs 200 by an auxiliary fluid compressor 202, fluid springs 200 support a portion of the load of the sprung mass. Normally a leveling sensor will monitor the level of the vehicle and supply the fluid springs 200 with additional compressed fluid from auxiliary fluid compressor 202 to raise the level of the vehicle back to design height after it has been loaded. Fluid springs 200, which now support a portion of the load supported by the rear wheels, thus cause the actuation member 10 to misread the amount of load being supported by the rear wheels.

With the vehicle at design height, loading the vehicle will cause the sprung mass to lower as described above. With a load leveling system active, the leveling sensor will immediately detect and correct the attitude of the vehicle to bring the sprung mass back to design height. Thus actuation member 10 begins as its pre-specified design length with the pre-specified load being exerted on valve 20. As the vehicle is loaded, actuation member 10 increases this load due to the counterclockwise rotation of eye 90. The leveling system then activates and returns the vehicle to the design height by removing a portion of the weight from the springs. This reduction of weight on the springs then rotates eye 90 clockwise thus returning actuation member 10 to its pre-specified design length and load. Proportioning valve 20 and the braking system is thus unaware of the additional weight being supported by the rear wheels and thus the braking distribution between the front and rear wheels will not respond to the increased load on the rear of the vehicle.

The present invention resolves this problem by correcting actuation member 10 due to the activation of the leveling system. The present invention includes a parallel activation cylinder which is shown in FIGS. 4 and 5 and is designated generally by the reference numeral 110. Activation cylinder 110 may be incorporated as original equipment on the vehicle or it may be retrofitted to the vehicle without requiring modifications to the original braking system of the vehicle. Activation cylinder 110 provides a means for applying an additional load on proportioning valve 20 and comprises a fluid cylinder 112, a linkage 114 attaching fluid cylinder 112 to the vehicle and a linkage 116 attaching fluid cylinder 112 to cap 42 of actuator 22.

Fluid cylinder 112 is comprised of a tubular cylinder 118 having a cap 120 sealingly attached to cylinder 118 at one end and a cap 122 sealingly attached to cylinder 118 at the opposite end. A pair of access ports 124 and 126 extend through the wall of cylinder 118 and provide access to an internal chamber 128 of cylinder 118. Disposed within chamber 128 between access ports 124 and 126 is piston 130. Piston 130 is connected to a piston rod 132 which extends axially through chamber 128 and through a hole 134 extending through cap 120. The end of piston rod 132 which is on the outside of cylinder 112 is secured to the body of the vehicle by linkage 114. The opposite end or cap 122 of fluid cylinder 112 is attached to cap 42 of actuator 22 by linkage 116. The attachment of linkage 114 to the body of the vehicle and the attachment of linkage 116 to cap 42 provides for a limited amount of rotational freedom between the components but does not allow axial freedom.

Access port 124 is in communication with the fluid pressure being supplied to fluid springs 200 of the vehicle which are a part of the load leveling system. FIG. 6 shows a schematic diagram of the fluid lines 204 for the leveling system with activation cylinder 110 incorporated. Access port 126 is open to the atmosphere to allow free movement of piston 130.

The operation of the system is similar to that described above with the components initially positioned as shown in FIG. 4. Actuation member 10 is assembled to a specified length and a specified load is being exerted on actuation rod 32 by coil springs 50 and 52. The fluid pressure within activation cylinder 110 is the same as the surrounding atmosphere and all weight is being supported by the vehicle's leaf springs. When weight is added to the rear of the vehicle, the sprung mass moves lower and is supported by the flexing of the leaf springs including leaf springs 88. This flexing of leaf spring 88 causes eye 90 of leaf spring 88 to rotate in a counterclockwise direction as shown in FIG. 4. This counterclockwise movement of eye 90 moves linkage 26 to the right as shown in FIG. 4 to further compress springs 50 and 52. The further compression of coil springs 50 and 52 exerts a larger load on actuation rod 32 and proportioning valve 20 is signaled to direct a higher portion of the braking load to the rear wheels as the rear wheels are now supporting a an increased load. The leveling sensor will immediately detect and correct the attitude of the vehicle to bring it back to design height. As described above, without the incorporation of the present invention, proportioning valve 20 is fooled by actuation member 10 and does not realize that additional weight is being supported by the rear wheels. To correct this, fluid cylinder 112 is supplied with the same fluid pressure at port 124 which the fluid springs 200 of the leveling system are supplied with. Thus, by knowing the spring rate of the vehicle's suspension system and the diameters of the fluid cylinders, the fluid pressure required to support the additional load for the entire movement of the suspension through jounce and rebound can easily be calculated. Knowing the fluid pressure versus load and taking into consideration the amount of rotation of leaf spring eye 90, it is simple to calculate the amount of compression on coil springs 50 and 52 and thus the loads which will be exerted on proportioning valve 20 throughout the suspension movement of the vehicle. Once the pressure of the leveling system is known and the load required to be exerted on the proportioning valve is known it is a simple calculation to determine the size of fluid cylinder 112 to exert the given load using the fluid pressure available from the load leveling system.

Thus fluid cylinder 112 is sized to exert the identical load on proportioning valve 20 which would have been exerted by actuation member 10 if the leveling system was not incorporated. In operational sequence, although this happens simultaneously, the loading of the vehicle causes actuation member 10 to increase the amount of braking in the rear wheels of the vehicle, by a specified amount, the leveling system brings the vehicle back to design height and thus reduces the amount of braking in the rear wheels by the same specified amount. The activation cylinder 112 then increases the amount of braking in the rear of the vehicle by the same specified amount due to the fluid pressure being supplied to cylinder 112. The vehicle is now again capable of proportioning the braking of the vehicle based on the loading conditions of the vehicle.

While fluid cylinder 112 was shown having cylinder piston rod 132 attached to the frame of the vehicle, piston rod 132 could be reversed and be attached to cap 24. If this were the case it would then become necessary to supply port 126 with fluid pressure from the leveling system and vent port 124 to atmosphere. In a similar manner, linkage 24 could be used to attach actuator 22 to the rear suspension and linkage 26 could be used to attach actuator 22 to valve 20. In addition, piston 46, coil spring 50, coil spring 52 and guide 48 could be reversed within chamber 44 which would then require hook 60 to extend axially through the center of chamber 44, coil spring 52, guide 48, coil spring 50 and piston 46. Retainer 74 would then be located on the side of piston 46 adjacent the closed end of body 40. The operation of actuation member 10 would be identical, it would just be the components which are reversed.

While the above detailed description describes the preferred embodiment of the present invention, it should be understood that the present invention is susceptible to modification, variation and alteration without deviating from the scope and fair meaning of the subjoined claims.

What is claimed is:

1. An actuation member for a vehicle having a braking system and a load leveling system, said actuation member operable to exert a first and a second complimentary load on a proportioning valve of said braking system, said actuation member being disposed between said proportioning valve and a first end of a suspension member which is remote from a connection of said suspension member to an axle of said vehicle, said actuation member comprising:

first means for mechanically linking said actuation member to one of said proportioning valve of said braking system or said first end of said suspension member of said vehicle;

second means for mechanically linking said actuation member to the other of said proportioning valve or said first end of said suspension member;

means for generating said first load, said means for generating said first load being operative to vary the amount of said first load in response to movement of said first end of said suspension member from which said actuation member is mechanically linked; and means for generating said second load, said means for generating said second load being operative to vary the amount of said second load in response to activation of said load leveling system.

2. The actuation member according to claim 1, wherein said means for generating said first load comprises:

a first housing fixedly secured to said first means for mechanically linking said actuation member;

a first rod fixedly secured to said second means for mechanically linking said actuation member;

first biasing means disposed between said first rod and said first housing, said first biasing means being operative to exert said first load.

3. The actuation member according to claim 2, wherein said means for generating said second load comprises:

a second housing fixedly secured to one of said first housing or said vehicle;

a second rod fixedly secured to the other of said first housing or said vehicle;

second biasing means disposed between said second rod and said second housing, said second biasing means being operative to exert said second load.

4. The actuation member according to claim 3, wherein said second biasing means is fluid pressure being supplied to said load leveling system.

5. The actuation member according to claim 2, wherein said first biasing means is at least one coil spring.

6. The actuation member according to claim 1, wherein said means for generating said second load comprises:

a housing fixedly secured to one of said proportioning valve or said vehicle;

a rod fixedly secured to the other of said proportioning valve or said vehicle;

biasing means disposed between said rod and said housing, said biasing means being operative to exert said second load.

7. The actuation member according to claim 6, wherein said biasing means is fluid pressure being supplied to said load leveling system.

8. The actuation member of claim 1, wherein said second means for mechanically linking said actuation member is adjustable to vary the amount of said first load.

9. A braking system for a vehicle having a front braking system, a rear braking system and a load leveling system, said braking system comprising:

a proportioning valve for distributing the braking of said vehicle braking system between said front braking system and said rear braking system, said proportioning valve being operative in response to a load to vary the amount of braking between said front braking system and said rear braking system and wherein said load leveling system is operatively connected with a suspension system of said vehicle;

an actuation member disposed between said proportioning valve and a first end of a suspension member of said suspension system which is remote from a connection of said suspension system to an axle of said vehicle, said actuation member operable to exert a first and a second complimentary load on said proportioning valve;

first means for attaching said actuation member to one of said proportioning valve or said first end of said suspension member of said suspension system;

second means for attaching said actuation member to the other of said proportioning valve or said first end of said suspension member of said suspension system;

means for generating said first load, said first means for generating said first load being operative to vary the amount of said first load in response to movement of said suspension system from which said actuation member is attached; and means for generating said second load, said second means for generating said second load being operative to vary the amount of said second load in response to activation of said load leveling system.

10. The braking system of claim 9, wherein said second means for attaching said actuation member is adjustable to vary the amount of said load.

11. The braking system according to claim 9, wherein said means for generating said first load comprises:

a first housing fixedly secured to said first means for attaching said actuation member;

a first rod fixedly secured to said second means for attaching said actuation member;

first biasing means disposed between said first rod and said first housing, said first biasing means being operative to exert said first load.

12. The braking system according to claim 11, wherein said means for generating said second load comprises:

a second housing fixedly secured to one of said first housing or said vehicle;

a second rod fixedly secured to the other of said first housing or said vehicle;

second biasing means disposed between said second rod and said second housing, said second biasing means being operative to exert said second load.

13. The braking system according to claim 12, wherein said second biasing means is fluid pressure being supplied to said load leveling system.

14. The braking system according to claim 11, wherein said first biasing means is at least one coil spring.

15. The braking system according to claim 9, wherein said means for generating said second load comprises:

a housing fixedly secured to one of said proportioning valve or said vehicle;

a rod fixedly secured to the other of said proportioning valve or said vehicle;

biasing means disposed between said rod and said housing, said biasing means being operative to exert said load.

16. The braking system according to claim 15, wherein said biasing means is fluid pressure being supplied to said load leveling system.

* * * * *